No. 12,211. Reissued April 5, 1904.

UNITED STATES PATENT OFFICE.

JOHN W. JOHNSON AND LEE LOCK, OF UPPER SANDUSKY, OHIO.

PROCESS OF PREPARING RICE OR LIKE CEREAL FOOD PRODUCTS.

SPECIFICATION forming part of Reissued Letters Patent No. 12,211, dated April 5, 1904.

Original No. 749,564, dated January 12, 1904. Application for reissue filed February 15, 1904. Serial No. 193,766.

*To all whom it may concern:*

Be it known that we, JOHN W. JOHNSON and LEE LOCK, citizens of the United States, residing at Upper Sandusky, in the county of Wyandot and State of Ohio, have invented certain new and useful Improvements in Processes of Preparing Rice or Like Cereal Food Products, of which the following is a specification.

Our said invention consists in an improved process for preparing rice or like cereal foods, in which the principal step consists in a method of parching and "raising" said rice, which has heretofore been very difficult to accomplish.

Said process consists in first washing said rice and then cooking it by boiling until it is in nearly edible condition. It is preferably cooked in as small a quantity of water as possible in order that when done it may be nearly dry. It is then taken out and spread upon cloths or trays and dried in any suitable manner by ordinary driers or in the sun. It is then parched and "raised" by being placed upon sand (or similar substance) which has been heated to a high temperature. In practice we place a quantity of sand in the bottom of an iron kettle or vessel and heat the same to a high temperature and then spread a quantity of the prepared rice thinly over said sand. The action of the heat and the granular surface raises and parches said rice suitably. Said rice is then separated from the sand in any suitable manner, as by screening, when it is in a condition for use. It may be served with sugar and cream, as are ordinary breakfast-foods, or it may be made into cakes by use of adhesive substance, such as is ordinarily employed in the manufacture of pop-corn cakes. Rice thus prepared may be used in a variety of ways, the invention consisting in its preparation to this point, which has heretofore been a very difficult matter to accomplish.

While we have described this process as particularly adapted for preparing rice, it will be understood, of course, that it may be used for preparing any cereal for which it is found adapted.

Having thus fully described our said invention, what we claim as new, and desire to secure by Letters Patent, is—

1. The process of preparing rice which consists in cooking the same until it is in nearly edible condition, then drying until it is in an approximately dry condition, and then swelling and parching the same by spreading it upon heated sand, substantially as set forth.

2. The process of preparing rice which consists in cooking the same by boiling it, then drying it until the moisture is nearly removed, and then swelling and parching it by spreading it upon a surface covered with sand heated to the requisite temperature, substantially as set forth.

3. The process of preparing a cereal which consists in cooking the same until it is in nearly edible condition, then drying until it is in an approximately dry condition, and then swelling and parching the same by spreading it upon heated sand, substantially as set forth.

In witness whereof we, the said JOHN W. JOHNSON and LEE LOCK, have hereunto set our hands, at Upper Sandusky, Ohio, this 2d day of February, A. D. 1904.

J. W. JOHNSON.
LEE LOCK.

Witnesses:
GEO. J. STECHER,
CHAS. G. MATSON.